(12) United States Patent
Reddem

(10) Patent No.: US 11,201,947 B2
(45) Date of Patent: Dec. 14, 2021

(54) LOW LATENCY ACCESS TO APPLICATION RESOURCES ACROSS GEOGRAPHICAL LOCATIONS

(71) Applicant: Citrix Systems, Inc., Fort Lauderdale, FL (US)

(72) Inventor: Dileep Reddem, Coral Springs, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/854,120

(22) Filed: Apr. 21, 2020

(65) Prior Publication Data

US 2021/0329096 A1  Oct. 21, 2021

(51) Int. Cl.
| | |
|---|---|
| *G06F 21/56* | (2013.01) |
| *G06F 9/48* | (2006.01) |
| *H04L 29/08* | (2006.01) |
| *H04L 29/06* | (2006.01) |
| *H04L 29/12* | (2006.01) |

(52) U.S. Cl.
CPC ........ *H04L 67/327* (2013.01); *H04L 61/1511* (2013.01); *H04L 63/10* (2013.01); *H04L 67/146* (2013.01); *H04L 67/2814* (2013.01); *H04L 67/2842* (2013.01); *H04L 67/42* (2013.01); *H04L 63/0272* (2013.01)

(58) Field of Classification Search
USPC ....... 709/201, 202, 203, 231, 227, 249, 228, 709/250
See application file for complete search history.

(56) References Cited

U.S. PATENT DOCUMENTS

| | | | | |
|---|---|---|---|---|
| 9,645,989 | B2* | 5/2017 | Folsom | G06F 40/174 |
| 10,235,996 | B2* | 3/2019 | Renard | G10L 15/18 |
| 2007/0220155 | A1* | 9/2007 | Nalla | H04L 67/14 |
| | | | | 709/227 |

(Continued)

FOREIGN PATENT DOCUMENTS

KR  20170070094 A  *  6/2017  ............. G10L 15/30

OTHER PUBLICATIONS

Introducing the new paradigm of Social Dispersed Computing: Applications, Technologies and Challenges (Year: 2018).*

(Continued)

*Primary Examiner* — Jude Jean Gilles
(74) *Attorney, Agent, or Firm* — Foley & Lardner LLP

(57) ABSTRACT

Described embodiments provide systems and methods for reducing latency in accessing application resources. The first device may be intermediary between a client and a server, and may receive a request of a user session for an application resource from the server. The first device may determine, responsive to the request that a user context of the user session is with a second device at a second location. The second location can be farther from the server than a first location of the first device. The first device may send, responsive to the determination, a request to the second device to obtain the user context of the user session. The first device may provide the client with access to the application resource via the user session. The first device may provide the client with access to the application resource according to the obtained user context.

20 Claims, 7 Drawing Sheets

(56) References Cited

U.S. PATENT DOCUMENTS

| | | | | |
|---|---|---|---|---|
| 2011/0137974 A1* | 6/2011 | Momchilov | ............ | H04L 67/38 |
| | | | | 709/202 |
| 2012/0182995 A1* | 7/2012 | Li | ......................... | H04W 40/36 |
| | | | | 370/392 |
| 2014/0075555 A1* | 3/2014 | Shilimkar | ............... | G06F 21/56 |
| | | | | 726/23 |
| 2014/0359735 A1* | 12/2014 | Lehmann | ............ | H04L 63/0884 |
| | | | | 726/7 |
| 2015/0088970 A1* | 3/2015 | Wei | ......................... | H04L 67/02 |
| | | | | 709/203 |
| 2015/0381740 A1* | 12/2015 | Gwin | ..................... | H04W 4/80 |
| | | | | 709/228 |
| 2018/0295134 A1 | 10/2018 | Gupta et al. | | |
| 2018/0359311 A1 | 12/2018 | Paramasivam | | |
| 2020/0210261 A1* | 7/2020 | Reddy | ..................... | H04L 67/10 |
| 2020/0348964 A1* | 11/2020 | Anand | .................. | G06F 9/3838 |

OTHER PUBLICATIONS

International Search Report and Written Opinion on PCT PCT/US2021/027074 dated Jul. 19, 2021.

\* cited by examiner

LOW LATENCY ACCESS TO APPLICATION RESOURCES ACROSS GEOGRAPHICAL LOCATIONS

FIELD OF THE DISCLOSURE

The present application generally relates to reduction of latency in computer and/or network environments, including but not limited to systems and methods for decreasing latency and/or increasing throughput in accessing application resources via devices in different locations.

BACKGROUND

An organization or a user may access a service over a network, which can include a service provided by an application hosted on the cloud and/or a server for instance. A connection proxy model can be used to access the service hosted on the cloud and/or the server. A problem with this model may be that a user request to access the service can be destined for a device and/or server in a foreign location. This may incur in a high latency and a decreased throughput across the network environment due to unnecessary transfer or detour of an entire data stream to the foreign location.

SUMMARY

This Summary is provided to introduce a selection of concepts in a simplified form that are further described below in the Detailed Description. This Summary is not intended to identify key features or essential features, nor is it intended to limit the scope of the claims included herewith.

The present disclosure is directed towards systems and methods for decreasing latency and/or increasing throughput in accessing application resources via devices in different locations. During a secured session (sometimes referred to as an authenticated, authorized, and audited (AAA) session), a first device (sometimes referred to as a gateway module, a local node, and/or an application delivery controller) intermediary between a client and a server (e.g., hosting the application resource) can receive data or traffic intended for or belonging to a second device (e.g., a gateway module, a foreign node, and/or an application delivery controller). The data or traffic can include or correspond to a request from a client to access an application resource from a server, for example, a request to access the first or second device's portal page for available application resources, a request destined to a server with the application resource, and/or a request for a software-as-a-service (SaaS) application.

The first device may evaluate and/or assess the request and may potentially serve some static pages for a user interface (UI), e.g., from a cache. The first device can verify, validate, and/or corroborate the presence of the application resource from the server. If the application resource is local or resides closer to the first device, the first device can send and/or direct an application programming interface (API) call to the second device. The first device may obtain and/or acquire a user context (e.g., a password, credentials, a group membership, an identification of authorized applications (e.g., for the user and/or client) and/or information for access policy determination) of the user session from the second device through the API call and/or may learn the user context on-demand. The user context may be utilized by the first device to set-up local context information and/or to route requests to the application resource from the server. If the application resource resides at and/or is hosted in a server that is local or resides closer to the second device, then the request of the user session may be sent and/or directed to the second device. In one embodiment, the first device may retrieve and/or acquire the user context through a request and/or query for a SaaS application. The first device may respond and/or react to the request and/or query for the SaaS application locally, thereby reducing and/or decreasing the latency that may be incurred if the request were sent and/or directed to the second device.

Each time the user context is obtained and/or acquired, the user context can be stored in the cache of the first device along with a mapping from data elements (e.g., bytes) stored in the cache to a cookie for the user session. The cookie for the user session can be created and/or generated by the first and/or second device and can include information of the user context and/or a destination of the request for the user session. Subsequently, instead of API calls to the second device, the first device may retrieve the user context and/or the cookie information from the cache, resulting in for instance a 50% reduction of latency and/or a 50% increase of throughput access. In some embodiments, the above techniques may be deployed in a hybrid multi-cloud environment and/or in traditional environments.

In one aspect, the present disclosure is directed to a method for reducing latency and/or increasing data throughput in accessing application resources via devices in different locations. The method may include receiving, by a first device, a request of a user session for an application resource from the server. The first device may be intermediary between a client and a server. The first device may determine, responsive to the request, that a user context of the user session is with a second device at a second location. The second location may be farther from the server than a first location of the first device. The first device can send, responsive to the determination, a request to the second device to obtain the user context of the user session. The first device may provide the client with access to the application resource via the user session. The first device may provide the client with access to the application resource according to the obtained user context.

In some embodiments, the first device receives the request from a domain name system (DNS) server. The request may be directed from the client to the first device by the DNS server. The first device may receive the request comprising a cookie for the user session, and can determine the availability of the user context according to information of the cookie. The first device may determine that the user context is absent from a cache of the first device.

In certain embodiments, the first device determines that the server is local to the first device, or resides closer to the first device than to the second device. The first device can send the request comprising an API call to the second device. The first device can receive, responsive to the request, the user context from the second device, and can store the user context in a cache of the first device. The first device may determine, according to the user context, whether the client is authorized to access the application resource.

In one aspect, the present disclosure is directed to a first device for reducing latency and/or increasing data throughput in accessing application resources via devices in different locations. The first device may comprise at least one processor that is intermediary between a client and a server. The at least one processor may be configured to receive a request of a user session for an application resource from the server. The at least one processor may be configured to determine, responsive to the request, that a user context of the user session is with a second device at a second location. The second location can be farther from the server than a first location of the first device. The at least one processor can be configured to send, responsive to the determination, a request to the second device to obtain the user context of the user session. The at least one processor may be configured to provide the client with access to the application resource via the user session. The at least one processor may be configured to provide the client with access to the application resource according to the obtained user context.

In some embodiments, the at least one processor may be configured to receive the request from a DNS server. The request may be directed from the client to the first device by the DNS server. The at least one processor can be configured to receive the request, which comprises a cookie for the user session, and to determine the availability of the user context according to information of the cookie. The at least one processor can be configured to determine that the user context is absent from a cache of the first device.

In certain embodiments, the at least one processor may be configured to determine that the server is local to the first device, or resides closer to the first device than to the second device. The request sent by the first device may comprise an API call to the second device. The at least one processor can be configured to receive, responsive to the request, the user context from the second device and store the user context in a cache of the first device. The at least one processor can be configured to determine, according to the user context, whether the client is authorized to access the application resource.

In one aspect, the present disclosure is directed to a non-transitory computer readable medium storing program instructions for reducing latency and/or increasing data throughput in accessing application resources via devices in different locations. The program instructions stored in a non-transitory computer readable medium may cause at least one processor to receive a request of a user session for an application resource from a server. The at least one processor may reside in a first device intermediary between a client and the server. The program instructions can cause the at least one processor to determine, responsive to the request, that a user context of the user session is with a second device at a second location. The second location can be farther from the server than a first location of the first device. The program instructions can cause the at least one processor to send, responsive to the determination, a request to the second device to obtain the user context of the user session. The program instructions may cause the at least one processor to provide the client with access to the application resource via the user session. The access may be provided to the client according to the obtained user context.

In some embodiments, the program instructions may cause the at least one processor to receive the request from a DNS server. The request may be directed from the client to the first device by the DNS server. The program instructions can cause the at least one processor to receive the request, which comprises a cookie for the user session, and determine the availability of the user context according to information of the cookie. The program instructions may cause the at least one processor to determine that the server is local to the first device, or resides closer to the first device than to the second device.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for reducing latency and/or increasing throughput in accessing application resources.

A. Network and Computing Environment

Figure 1A:
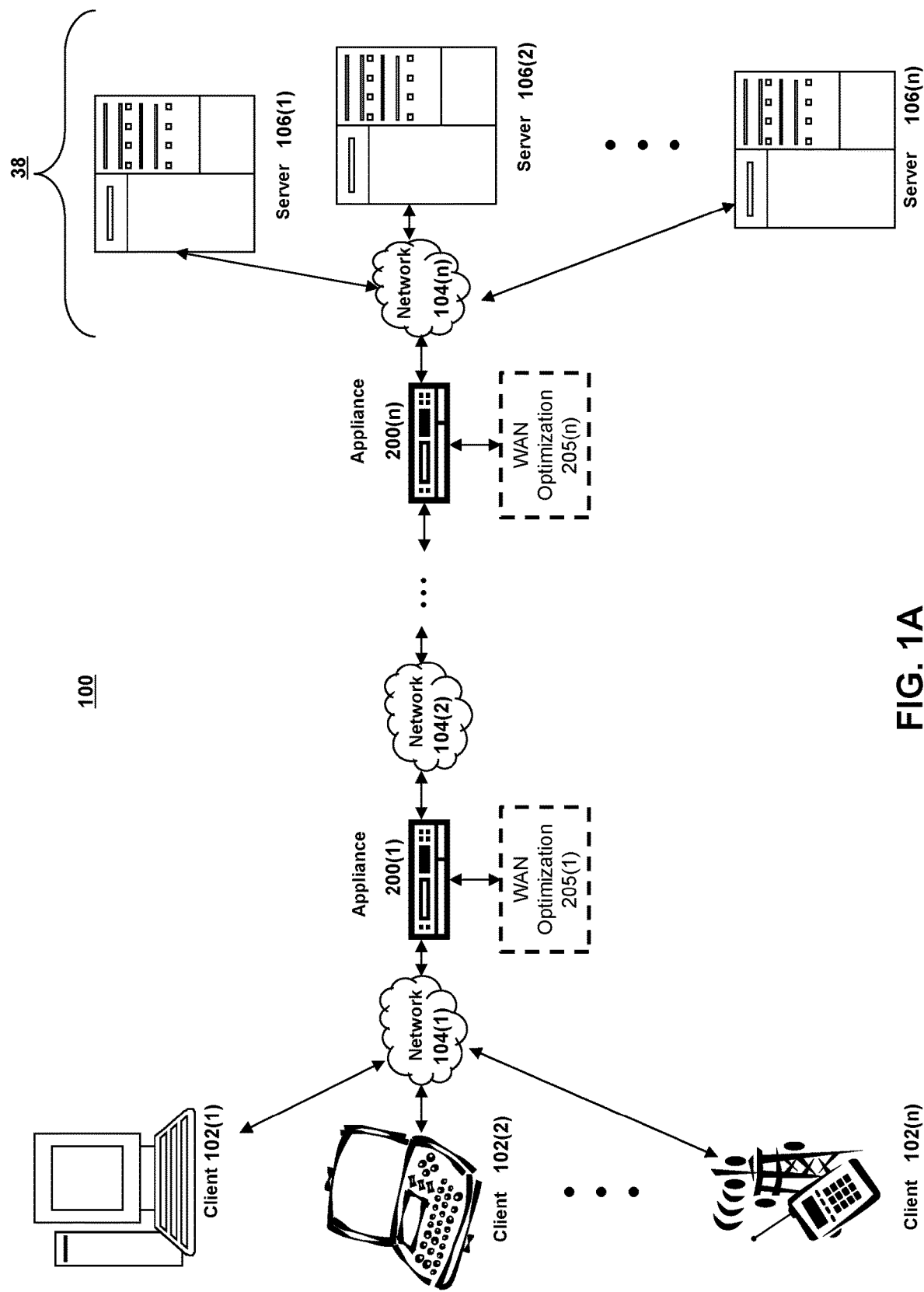
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, Fla.

Figure 1B:
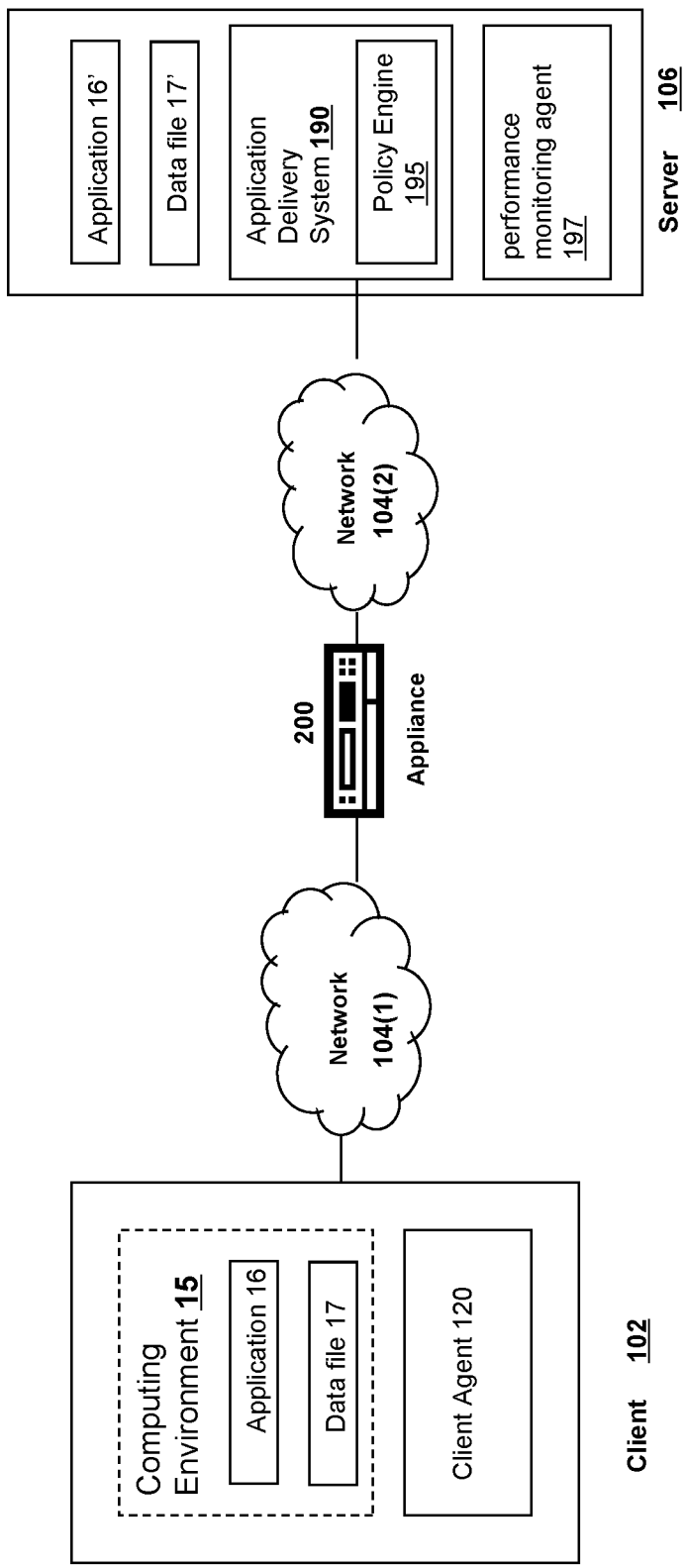
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
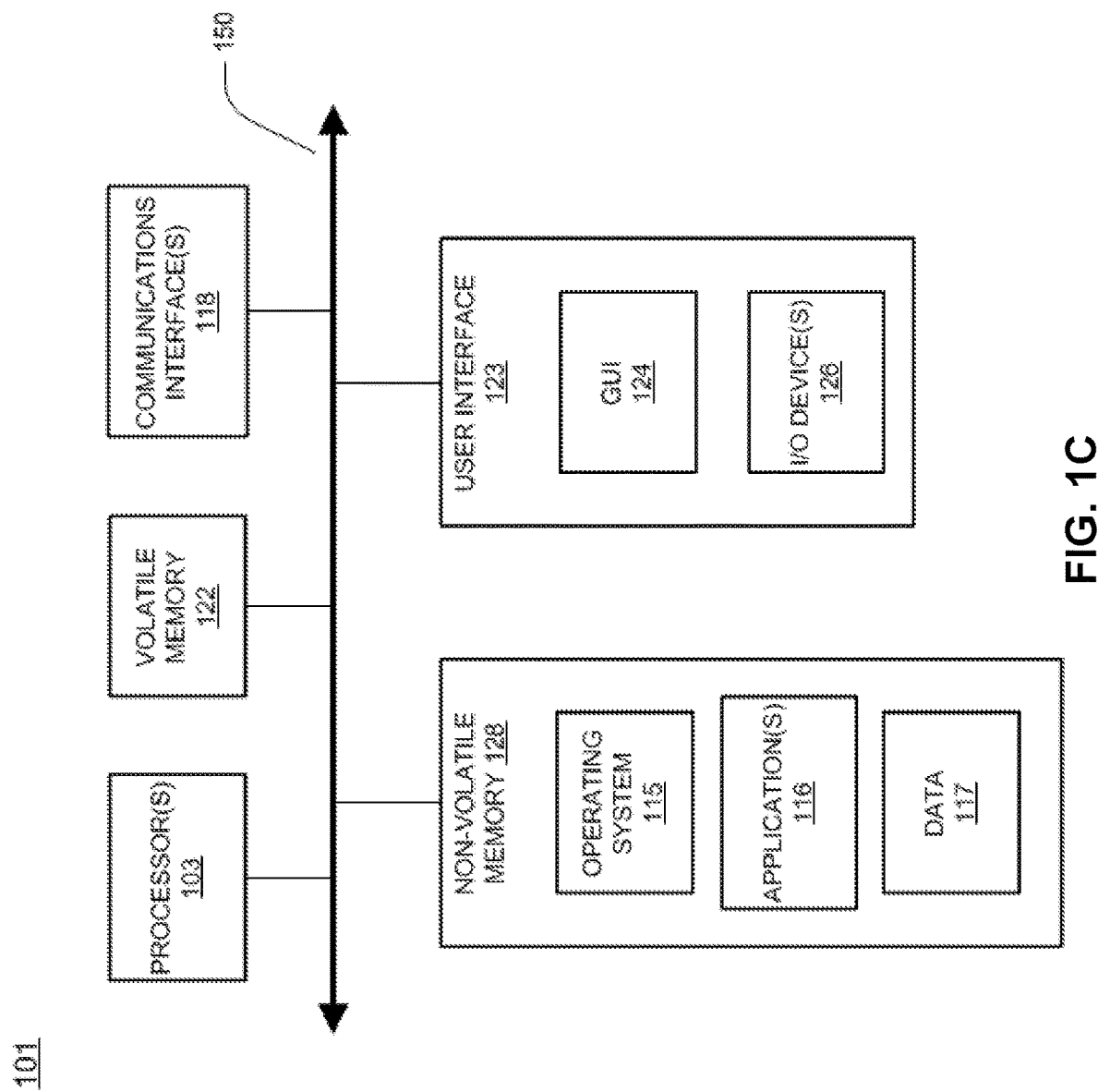
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

B. Appliance Architecture

Figure 2:
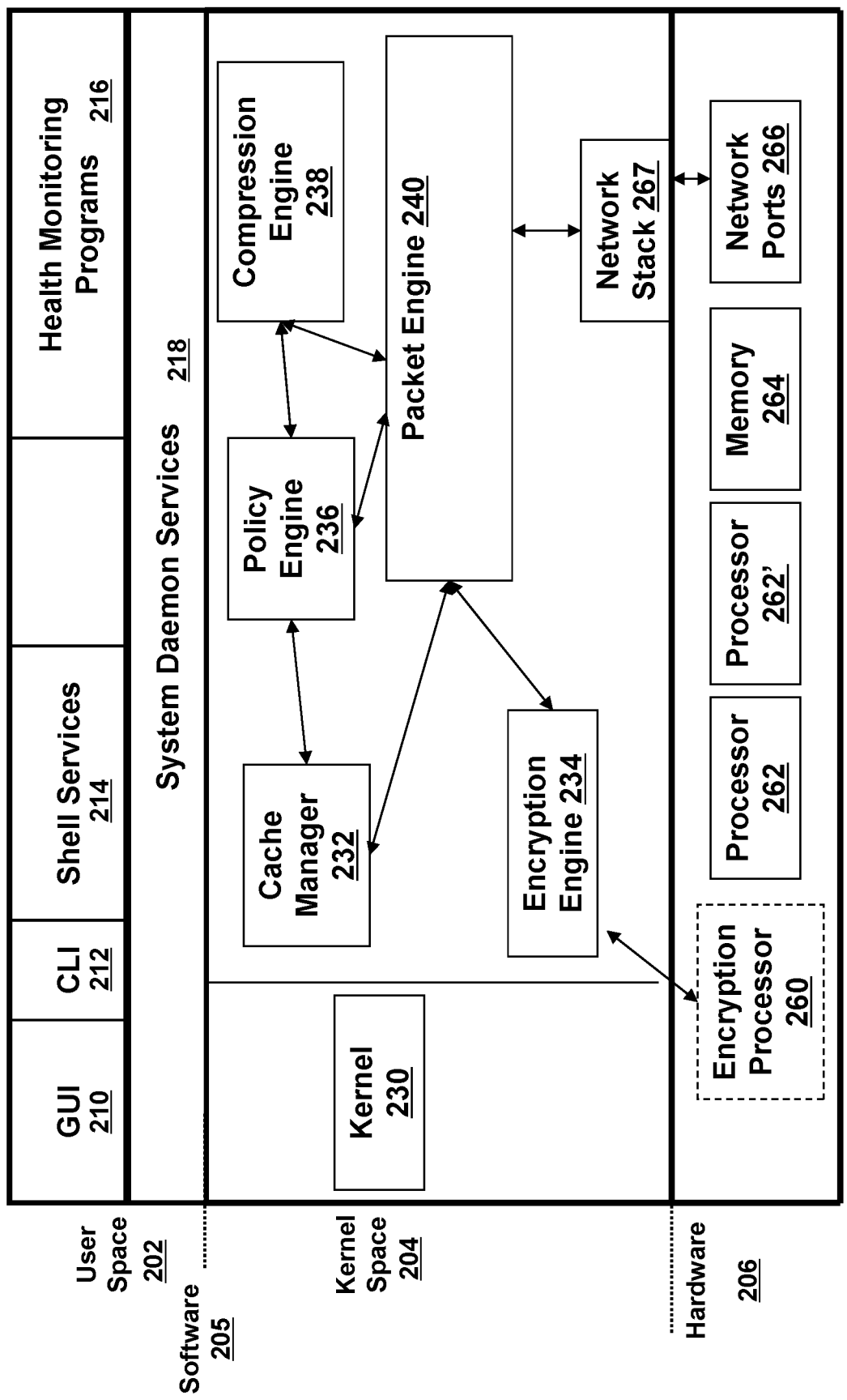
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to secure socket layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications.

For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, Fla., the teachings of which are hereby incorporated herein by reference.

C. Systems and Methods for Reducing Latency and Increasing Throughput Access

The present disclosure is directed towards systems and methods for decreasing latency and/or increasing throughput in accessing application resources via devices at different locations. Some network environments may use a system for providing access to an application resource of a server. A challenge posed by this system may be that a first device (e.g., a gateway module, a local node, and/or an application delivery controller) can receive a user request (e.g., a request to access the first or second device's portal page for available application resources, a request destined to a server with the application resource, and/or a request for a SaaS application) intended for or belonging to a second device at a foreign location (e.g., a gateway module, a foreign node, and/or an application delivery controller). The second device may store a user context (e.g., a password, credentials, a group membership, an identification of authorized applications (e.g., for the user and/or client) and/or information for access policy determination) that can include a device context associated with a specific user and/or can define whether a user with specific credentials is authorized to access an application resource. For instance, a DNS server may direct user requests for the same client or user session to different devices, such that a prior user request may have been directed to another device such as the second device, while the current user request is directed to the first device even though the second device has previously served or supported a prior user request, the client and/or the user session. The first device can thus receive the user request for an application resource from the DNS server, instead of the second device that has an associated user context that can be used to support the user request. The first device can thus receive the user request for an application resource from the DNS server, instead of the second device that has an associated user context that can be used to support the user request. The first device can transfer, route, detour and/or tunnel the user request and/or data stream (traffic associated with the application resource) in its entirety to the second device because the first device may not have access to the user context. However, the second device may then transfer the user request and/or data stream back to the first device if the cloud and/or server hosting the application resource is local or resides closer to the first device. Transferring or detouring the user request and/or data stream repeatedly between devices can add two additional secure socket layer (SSL) connections for instance, thus incurring high latency.

The systems and methods presented herein can result in for instance a 50% (or other percent) reduction of latency and/or a 50% (or other percent) increase of throughput by, among other things, avoiding two SSL connections and reducing round-trip traversal of the user request, user context, and/or data stream across devices in different geographical locations. According to some embodiment of the present solution, a first device can receive the user request, data stream and/or traffic intended for or belonging to a second device at a second location different from a first location of the first device. The first device can be intermediary between a client (that may send the user request), and the server hosting the application resource (e.g., a SaaS application). A domain name system (DNS) server can direct the user request from the client to the first and/or second device.

The first device can verify the location of the application resource from the server. If the application resource is local or resides closer to a second device, the first device can send the user request, data stream and/or traffic to the second device. If the application resource is local or resides closer to the first device, the first device can send an API call to the second device to obtain user context. An API can be a computer and/or software interface of a software application that may allow third parties to use the functionality of the software application. Multiple protocols may be utilized to send an API call, such as proprietary and/or public domain protocols. The protocols can include an authenticated API call (e.g., the recipient verifies the authenticity of the source prior to providing the requested data) and/or an API request sent through a metrics exchange protocol (MEP). The MEP can be used to share service status updates and/or statistics through an encrypted channel, thus providing a secured means for transferring data between the first and second device.

The first device may receive a user context (e.g., password, credentials, group membership, authorized applications, and/or information for access policy determination) of the user or user session from the second device, in response to the API call. The amount of data included in the user context can be significantly reduced by retrieving only necessary information from a lightweight directory access protocol (LDAP) server, for example user credentials and groups referenced in the configuration. The LDAP is a protocol used by web-based applications and/or other applications to search information from a server and/or maintain distributed directory information in an organized manner.

The first device can receive all or a portion of the user context (sometimes simply referred as user context) and may store it in a cache of the first device. The first device may utilize the user context to set-up local context information and/or to route requests to the application resource from the server. The cache of the first and/or second device can store a mapping from data elements stored in the cache (e.g., bytes) to a cookie for a user session, along with the user context. The first and/or second device can provide or create the cookie for the user session, which can include information of the user context and/or the destination of the request for an application resource.

Figure 3:
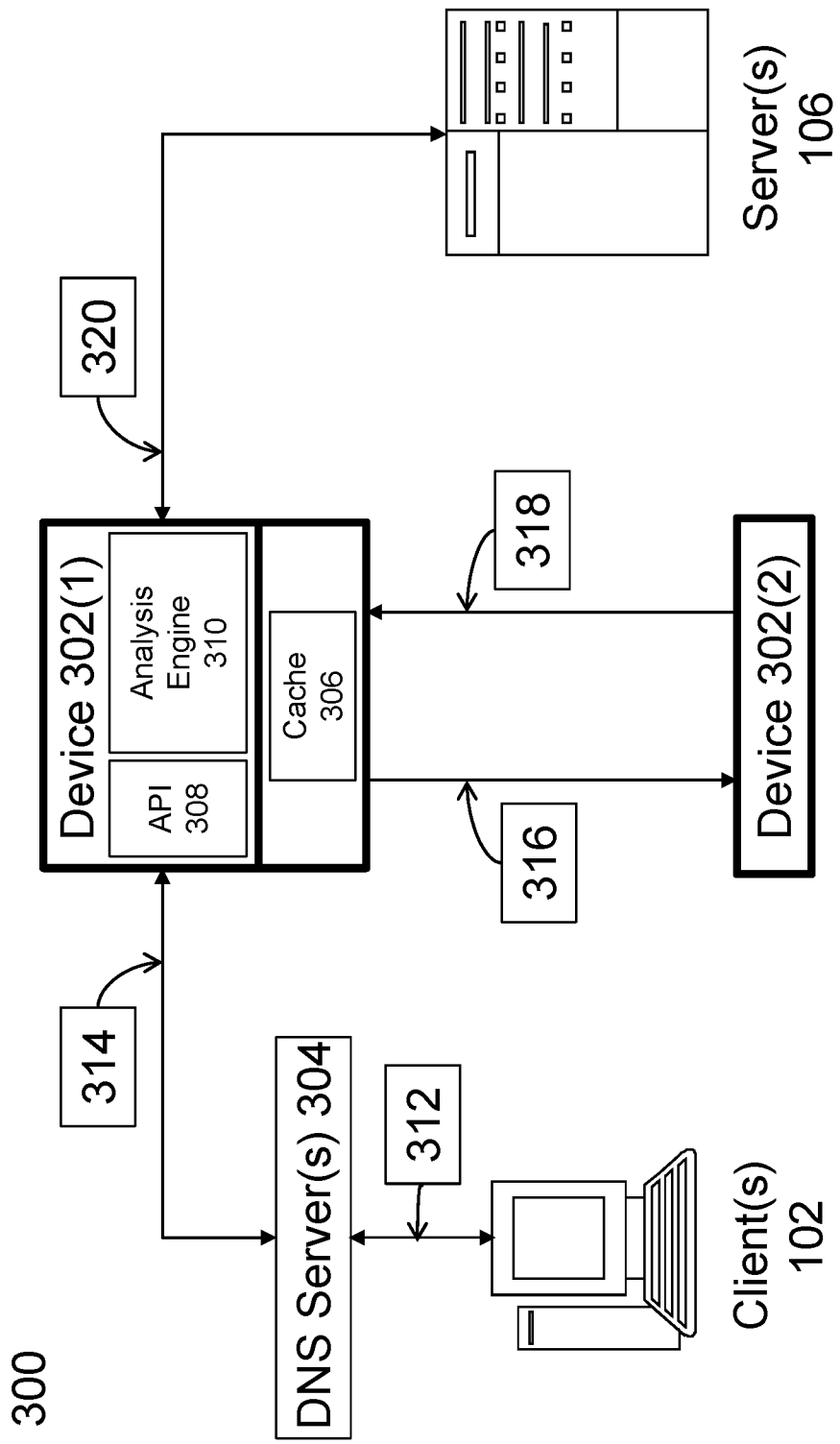
FIG. 3 is a block diagram of an example system for providing access an application resource of the server, in accordance with an illustrative embodiment.

As indicated above, certain embodiments of the system for providing access to an application resource of a server can result in unnecessary transfer or detour of an entire data stream across multiple devices located in different locations, and hence may incur high latency and degrade user experience at the client. Referring to FIG. 3, depicted is a block diagram of one example embodiment of the system for providing access to an application resource of a server. In this embodiment, the client(s) 102 can send a user request for the application resource from the server(s) 106. Referring to operations 312 and 314, the DNS server(s) 304 can receive the user request from the client(s) 102 and may direct the user request to the first device 302(1) that can be intermediary between the client(s) 102 and the server(s) 106. Referring now to operation 316, the first device 302(1) can determine that the user context is with the second device 302(2) and can send the user request and/or data stream in its entirety to the second device 302(2). Referring now to operation 318, if the application resource were hosted on the server(s) 106 that is local or resides closer to the first device 302(1), the second device 302(2) may transfer and/or send the user request and/or data back to the first device 302(1). In operation 320, the first device 302(1) can send the user request and/or data to the server(s) 106 and may provide the client(s) 102 with access to the application resource according to the user context.

Operations 316 and 318 illustrate that two additional SSL connections in the traffic path can cause unnecessary transfer or detour of data across devices 302 in different locations, and thus can incur high (transmission or network) latency. To address this challenge and problem, some embodiments of the present solution can reduce the latency in accessing application resources by eliminating and/or replacing operations 316 and 318. Operations 316 and 318 can instead be eliminated and/or replaced by an API call to obtain, transfer, and/or receive the user context from the second device 302(2) to the first device 302(1), e.g., if the first device 302(1) determines that the server(s) 106 is local or resides closer to the first device 302(1).

For example, responsive to the first device 302(1) determining that the first device 302(1) is local or nearer to the server 106 (and application resource) than the second device 302(2) which has the user context, the first device 302(1) may send an API call to the second device 302(1) to request for the user context. In doing so, the first device 302(1) can obtain and then use the user context locally, to locally route traffic of the application resource directly to the client 102 (via the first device 302(1) but not the second device 302(2)). Thus, the first device 302(1) can avoid having to route or detour the traffic of the application resource through the first device 302(1) and additionally through the second device 302(1) (that is located farther away from the server 106 and/or the client 102, to leverage on the user context located at the second device 302(1)) to the client 102. As such, by using a local copy or portion of the user context to manage access to the application resource and to reduce the overall transmission path of the traffic, this can reduce the latency of traffic, and can improve user experience at the client 102 in accessing the application resource.

Figure 4:
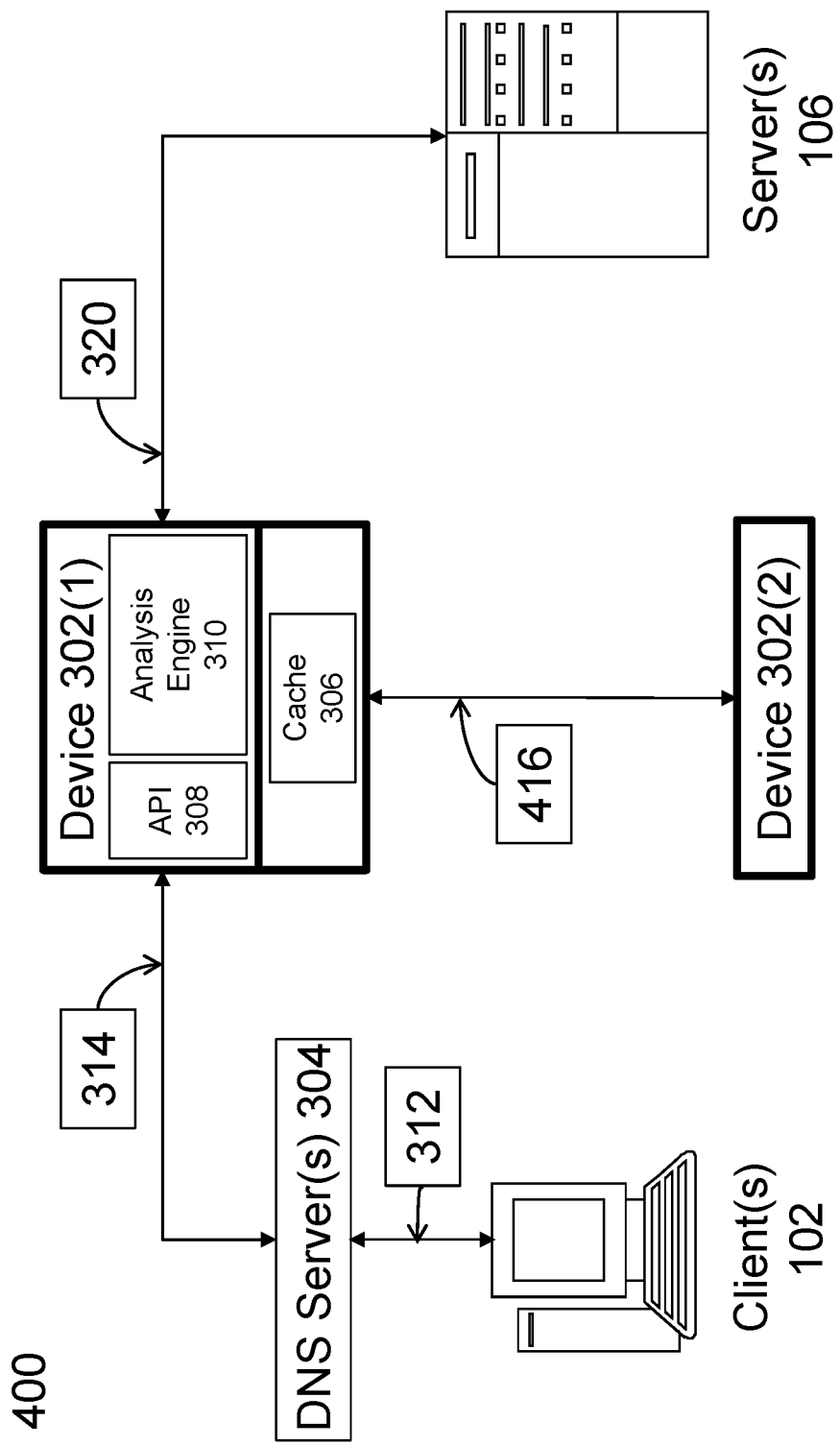
FIG. 4 is a block diagram of an example system for reducing latency and/or increasing throughout in accessing application resources, in accordance with an illustrative embodiment.

Referring to FIG. 4, depicted is a block diagram of one example embodiment of a system 400 for reducing latency and/or increasing throughput in accessing application resources. The system 400 may include one or more clients 102, one or more DNS servers 304, one or more devices 302, and/or the server(s) 106 hosting one or more application resources. The device(s) 302 may be intermediary between the client(s) 102 and the server(s) 106. The device(s) 302 can include one or more APIs 308, an analysis engine 310, and/or a cache 306 that can store a user context.

Each of the above-mentioned elements or entities is implemented in hardware, or a combination of hardware and software, in one or more embodiments. Each component of the system 400 may be implemented using hardware or a combination of hardware or software detailed above in connection with FIG. 1C. For instance, each of these elements or entities can include any application, program, library, script, task, service, process or any type and form of executable instructions executing on hardware of a client 102, a server 106 and/or a network device 200 in connection with FIGS. 1B-1C, for instance. The hardware includes circuitry such as one or more processors in one or more embodiments.

The system 400 may include one or more servers 106. The server 106 may be configured and/or designed to host one or more services (e.g., application resources, as a web application, SaaS application or remote-hosted network application) and/or to provision the one or more services to one or more clients 102 of a consumer or other entity (e.g., an organization or user), via one or more networks 104. For example, the client 102 may establish one or more sessions or connections (e.g., secured or otherwise, such as a SSL virtual private network connection) with the server(s) 106 to access a service, such as an application resource. The server(s) 106 can be part of a cloud or datacenter for instance. The server(s) 106 may include any embodiment of volatile memory 122 or non-volatile memory 128 (discussed in FIG. 1C for example) which may store files, data and/or content of the service. The server(s) 106 may communicate with other various components of the system 400 in FIG. 4 via a communications interface 118 for instance. Hence, the server(s) 106 may be similar in some aspects to the computer 101 described with reference to FIG. 1C.

To provide a service, the server(s) 106 may execute, provide, provision, and/or host one or more network application(s). In some embodiments, a service may be referred to interchangeably with an application, application resource or network application. A network application can for instance include a remote-hosted application, a remote-hosted desktop, a web application or a software-as-a-service (SaaS) application. A remote-hosted desktop may be a virtual desktop hosted on the server 106 which is accessed by or remotely provisioned to the client 102. In some embodiments, the delivery of a remote-hosted desktop may be via a session and/or connection based on High-Definition User Experience (HDX) or Independent Computing Architecture (ICA) display remoting protocol, or Remote Desktop Protocol (RDP). A remote-hosted application may include/correspond to an application service that can be delivered via a HDX-based, ICA-based, RDP-based, etc., session and/or connection. In some embodiments, a remote-hosted application may be an application which is installed on/in the remote-hosted desktop environment and is therefore accessible within the remote-hosted desktop. A SaaS application can be a centrally-hosted application which is typically accessible on a subscription basis. In some embodiments, the SaaS applications may include web-based applications. In other embodiments, the SaaS applications may correspond to remote-hosted applications and, therefore, can be delivered in HDX/ICA/RDP-based sessions and/or connections. SaaS applications and/or web applications may include for instance salesforce.com, SAP, Microsoft Office 365, Dropbox or Gmail service, Amazon web services, and so on.

The system 400 may include one or more clients 102. The client 102 may be configured and/or designed to access application resource(s) over one or more networks. The client 102 may include or correspond to devices of a consumer of the service. For example, if the consumer is an individual or user, the client 102 may comprise a smartphone, a laptop (e.g., at home), a tablet device, and a desktop computer (e.g., at work), that the user may use to access an application resource (e.g., Dropbox service) at various times and/or locations for instance. In an example where the consumer is an organization, such as an enterprise, the consumer can extend over a number of users (e.g., management persons, staff members, IT administrators, and so on) and their associated client(s) 102 or devices (e.g., corporate-issued device, personally-owned devices, and/or registered/approved devices (e.g., in a BYOD program)). Any number of the users may access a service (e.g., salesforce.com, SAP, Microsoft Office 365) from a service provider, via a corporate account for the service for instance.

The system 400 may include one or more devices 302 (sometimes referred to as appliance(s) 200, gateway(s) 200, node(s), and/or application delivery controllers). A device 302 may be configured and/or designed to serve as an intermediary between different elements of a computer and/or network environment, such as between client(s) 102, server(s) 106, network(s) 104, and/or other devices 302 (e.g., as discussed above in connection with FIG. 2). In some embodiments, the device 302 may receive a request from a client 102 and/or user to access an application resource from the server 106 via a user session. The user session can describe or correspond to the activity and/or actions of a user during a specific period. The request may comprise, among other things, a cookie for the user session. The device 302 may be located at various points or in various communication paths, for example between two networks 104, within a computing and/or network environment 100. In other embodiments, the device 302 may be located on a network 104. The devices 302 may communicate with one another and/or work in conjunction to, for example, accelerate, protect and/or secure network traffic between clients 102 and servers 106 and/or provide load balancing of servers 106 to process requests from clients 102. In some embodiments, the devices 302 may act as a proxy or access server to provide access to the one or more servers 106, provide security and/or act as a firewall between the client 102 and the server 106, and/or provide a secure VPN connection from the client 102 to the server 106, such as a SSL VPN connection and/or provide encryption and decryption operations.

In some embodiments, the device 302 can include, among other elements, an API 308, a cache 306, and/or an analysis engine 310. The API 308 may be configured and/or designed as a means or interface for communicating with other elements of the system 400, for example with other devices 302. In one embodiment, the first device 302(1) in system 400 can send an API call (e.g., a message or request) to the second device 302(2) in system 400 to obtain the user context for a user (of a client 102) that may be requesting access to the service or application resource hosted on the server 106. The API call may occur in response to a determination that the user context of/for the user session (associated with the request) is with (e.g., maintained, stored or located at) the second device 302(2). Multiple protocols can be utilized to send an API call, such as proprietary and/or public domain protocols. One or more protocols may specify or support encryption/decryption, encoding/decoding and/or compression/decompression on content of an API call. The protocols can support an authenticated API call, whereby the recipient of the API call (e.g., the second device 302(2)) verifies the authenticity of the source (e.g., the first device 302(1)) prior to providing the requested data (e.g., the user context). In some embodiments, a metrics exchange protocol (MEP) protocol may be used to send an API call to other elements within the system 400, for instance to another device 302. The MEP protocol can be used to share service status updates and/or statistics through an encrypted channel, thus providing a secured means for transferring data between the elements of the system 400.

The cache 306 included in the device 302 may be configured and/or designed to store or maintain data and/or content, for example the user context and/or a mapping from data elements stored in the cache 306 to a cookie for the user session. In some embodiments, the cache 306 may include or correspond to a memory 264 of device 302, or may include or correspond to a physical memory having a faster access time than memory 264. The cache 306 may duplicate data (e.g., original data) stored elsewhere (e.g., a device 302), or maintain data previously computed, generated or transmitted to reduce the access time of the data. The cache 306 can be located within, outside, or adjacent to the device 302. In one embodiment, the cache 306 of the second device 302(2) can store the user context of the user session, which may be obtained and stored in the cache 306 of the first device 302(1) after determining that the user context is absent from the first device 302(1). The first device 302(1) may receive the user context from the second device 302(2) in response to a request comprising an API call from the first device 302(1), and can be stored in the cache 306. The user context can be any information usable to configure, manage, maintain and/or facilitate a user session (e.g., establishment and/or use of the user session) and/or configure, manage, control and/or facilitate access to an application resource (or a server 106 of the application resource). The user context can be any relevant data, knowledge, or information that can characterize a situation or aspect of a user or the user's client 102 (e.g., a location of the user/client, a profile of the user/client, and/or resources local to the user/client). The user context can include a password, user identification, user privileges (e.g., administrator rights and privileges), credentials, a group membership (e.g., group or membership privileges or preferences), an identification of authorized applications or resources (e.g., for the user and/or client), single-sign-on (SSO) information, user preferences/settings (e.g., for the user session or an associated application), and/or information for access policy determination (e.g., geographical or time based restrictions, or endpoint information of the client 102, such as operating system or application patch update/version, presence of anti-virus/malware software). The user context can include a device 302 context associated with a specific user and/or the user's client, and/or can define whether a user and/or client with specific credentials is authorized to access an application resource.

The first device 302(1) may utilize the user context to set-up local context information and/or to route or direct requests for the application resource from the server 106. In some embodiments, the cache 306 may store a mapping from data elements stored in the cache 306 to a cookie for the user session. The cookie for the user session can be created, generated, provided and/or established by the device 302, and can contain information of the user context and/or the destination of the user request. The destination of the user request can be an (e.g., encrypted) IP address of the server 106 that hosts the application resource and/or of the device 302 that has or stores the user context. The cookie can include information regarding the availability of the user context within the cache 306 of the first device 302(1). For example, the information may indicate a location or address where the user context may be obtained (e.g., that the user context is maintained at a second device 302(2)), and may indicate that the user context would not be available or present in the cache 306 of the first device 302(1).

The analysis engine 310 included in the device 302 may be configured and/or designed to allow a device 302 to identify, specify, define and/or configure a caching policy. The analysis engine 310 may be configured and/or designed to access, control and/or manage objects, data or content being cached by the device 302. The analysis engine 310 may be configured and/or designed to determine the location of the device 302 and/or proximity of the device 302 to other system 400 components/resources (e.g., a device 302, requested application resource, a client 102, a DNS server 304, and/or a server 106). The analysis engine 310 may be configured and/or designed to determine the location of an application resource (or server 106 hosting the application resource) and/or proximity of the application resource (or the server 106) to other system 400 components (e.g., a device 302, a client 102, a DNS server 304, and/or a server 106). The analysis engine 310 may be configured and/or designed to determine whether an application resource (or the server 106) is local to other system 400 components (e.g., a device 302, a client 102, a DNS server 304, and/or a server 106). The analysis engine 310 can be located within, outside, or adjacent to the device 302. The analysis engine 310 may comprise one or more programs or services that are executable individually or in some combination on hardware of the analysis engine 310.

The analysis engine 310 may interface and/or interact with one or more of the API 308, cache 306, and/or other elements, e.g., to determine a state, status, operating condition, and/or presence of data in a device 302 and/or in components that comprise the device 302. In some embodiments, the analysis engine 310 may determine if a user context is available in and/or absent from (e.g., the cache 306 of) the device 302. In some embodiments, the analysis engine 310 may, in response to a request from a client 102 (e.g., to access an application resource, or to establish a user session to access the application resource), determine whether a user context of a user of the client 102 is available. For instance, the analysis engine 310 may determine if the user context is absent from or present in the cache 306 of a first device 302(1) and/or the cache 306 of a second device 302(2). For instance, the analysis engine 310 may determine that the user context is present in the cache 306 of the second device 302(2) and/or is absent from the cache 306 of the first device 302(1).

The analysis engine 310 can interface and/or interact with one or more of API 308, cache 306, and/or other elements of device 302, to determine the location of the device 302 and/or the proximity of the device 302 to another entity (e.g., a client 102, a server 106, a DNS server 304, and/or another device 302). The analysis engine 310 can determine the location of the device 302 and/or the proximity of the device 302 to other elements that comprise a system 400 by, for example, analyzing and/or comparing the addresses (e.g., IP addresses) of the devices 302 and/or elements. The analysis engine 310 may utilize information provided by, supplied by, and/or stored in the cache 306, the user context, and/or the cookie to determine the location and/or proximity of the elements comprising a system 400. In some embodiments, the analysis engine 310 may determine that a user context is with a second device 302(2) at a second location that is farther from a server 106 than the first device 302(1) where the analysis engine 310 resides, in response to intercepting or receiving a request to access an application resource. In other embodiments, the analysis engine 310 may determine that the user context is with (or local to) the first device 302(1) at a first location that is nearer to (e.g., local to) a server 106 than the second device 302(2) to the server 106. Further, in some embodiments, the analysis engine 310 may determine that the server 106 (having, hosting or providing the requested application resource) is local to the first device 302(1) or resides closer to the first device 302(1) than to the second device 302(2). In other embodiments, the analysis engine 310 may determine that the server 106 is local to the second device 302(2) or resides closer to the second device 302(2) than to the first device 302(1).

Responsive to the outcome(s) of the determination(s), the device 302 (that intercepted or received the request) may send an API call to another device 302 to obtain the user context and store it in cache 306. For example, responsive to the first device 302(1) determining that the first device 302(1) is local or nearer to the server 106 (and application resource) than the second device 302(2) which has the user context, the first device 302(1) may send an API call to the second device 302(2) to request for the user context. In doing so, the first device 302(1) can obtain and then use the user context locally, to locally route traffic of the application resource directly to the client 102 (via the first device 302(1) but not the second device 302(2)). Thus, the first device 302(1) can avoid having to route or detour the traffic of the application resource through the first device 302(1) and additionally through the second device 302(2) (that is located farther away from the server 106 and/or the client 102, to leverage on the user context located at the second device 302(2)) to the client 102. As such, by using a local copy or portion of the user context to manage access to the application resource and to reduce the overall path of the traffic, this can reduce the latency of the traffic, and can improve user experience at the client 102 in accessing the application resource.

The analysis engine 310 can interface and/or interact with one or more of the API 308, the cache 306, and/or other elements of the device 302, to determine whether a client 102 is authorized to access and/or utilize an application resource (e.g., a SaaS application) from a server 106. For example, the analysis engine 310 can use user context obtained via the API 308 and/or stored into the cache 306, or user context retrieved from the cache 306, to determine whether a client 102 is authorized to access and/or utilize an application resource. If the client 102 is authorized (e.g., authenticated, trusted and/or certified), the analysis engine 310 can provide the client 102 with access via the user session. The user session may describe the activity and/or actions of a user during a specific period. In some embodiments, the analysis engine 310 may provide the client 102 with access according to the user context. The analysis engine 310 may utilize information included in the user context (e.g., a password, credentials and/or a group membership), that can be stored in cache 306, to determine whether a client 102 may have authorization, approval, and/or authorization to access and/or utilize an application resource, and/or to establish, resume, control, manage and/or continue a user session (e.g., to access the application resource).

The system 400 may include one or more domain name system (DNS) server(s) 304. The DNS server 304 may be configured and/or designed to identify, intercept or receive requests/calls from the client(s) 102 directed to the server(s) 106 and/or an application resource from the server(s) 106, and/or can route or direct the requests/calls to or through a device(s) 302. The DNS server 304 may be located at various points and/or in various communication paths, for example between two networks 104, within a computing and/or network environment 100. In other embodiments, the DNS server 304 may be located on a network 104. In some embodiments, the DNS server 304 can direct a user request to utilize an application resource from the client 102 to one of a plurality of devices 302, such as to a first device 302(1). In other embodiments, the DNS server 304 can direct a user request (to utilize/access an application resource) from the client 102, to a second device 302(2), e.g., instead of to the first device 302(1). The device 302 can receive the user request for an application resource from the DNS server 304, e.g., instead of another device 302 that has an associated user context that can be used to support the user request. Therefore, there may be situations where the receiving device 302 may not locally have a user context of the user originating the user request, have a user context from a prior user request, or have a user context from an existing or prior user session that has accessed the same or similar application resource of the server 106. In some situations, the (requested or intended) application resource or server 106 may not be local or near to the receiving device 302, as compared to another device 302 of the plurality of devices 302. As discussed herein, embodiments of the present systems and methods can avoid or prevent increased latency due to routing or detouring traffic associated with the application resource through multiple devices 302 in some of these situations.

Figure 5:
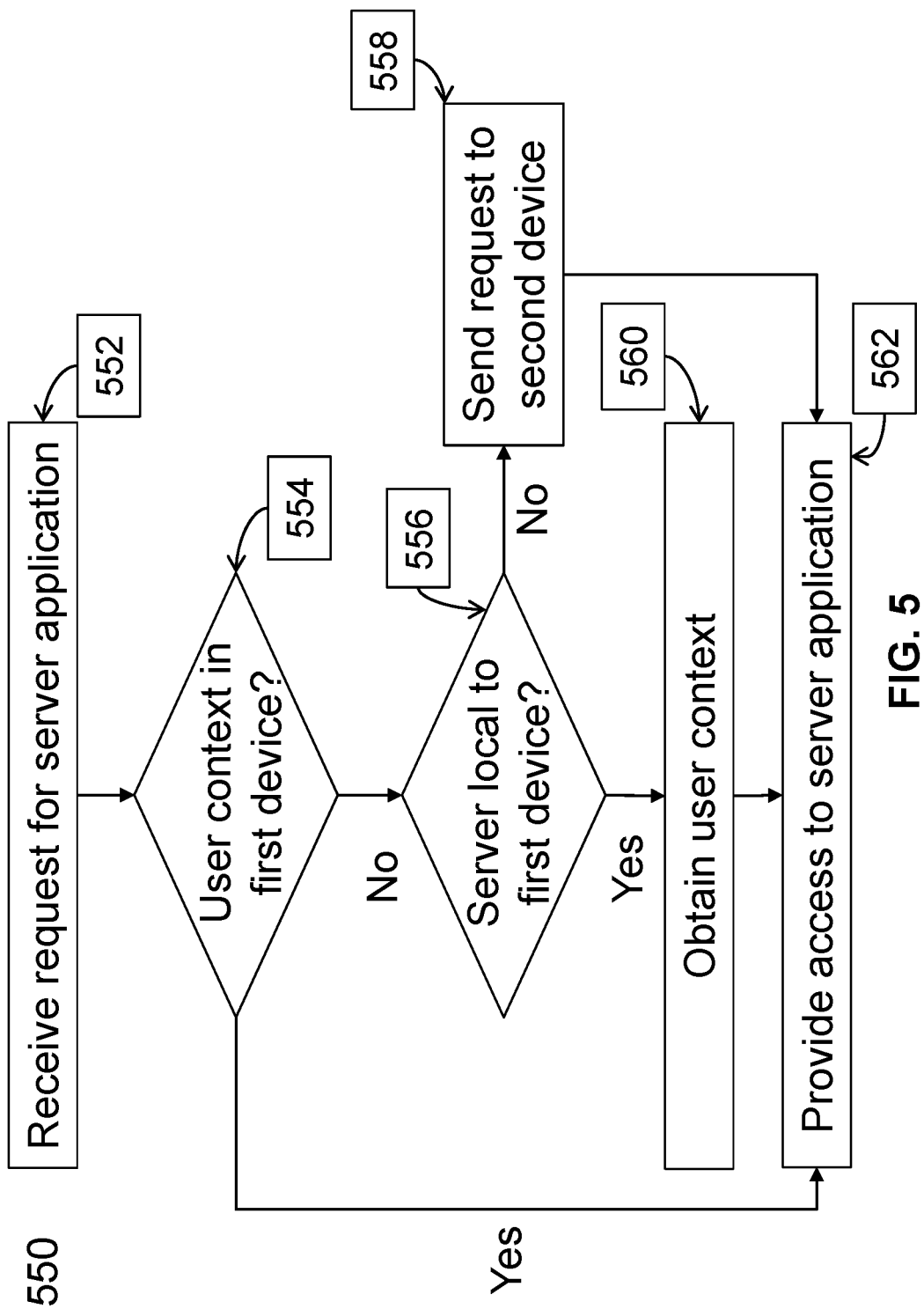
FIG. 5 is a flow diagram of a method for reducing latency and/or increasing throughput in accessing application resources, in accordance with an illustrative embodiment.

Referring to FIG. 5, depicted is a flow diagram of one embodiment of a method (550) for decreasing latency and/or increasing throughput in accessing application resources via devices in different locations. The functionalities of the method may be implemented using, or performed by, the components detailed herein in connection with FIGS. 1-4. In brief overview, a first device 302(1) may receive a user request for an application resource (552). The first device 302(1) may determine that a user context is or is not with (e.g., maintained, stored or located at) the first device (554). The first device 302(1) can provide access to the application resource (562) if the user context is with the first device 302(1). If the first device 302(1) determines that the user content is not with (e.g., maintained, stored or located at) the first device 302(1), the first device 302(1) may determine whether the server 106 is local or resides close to the first device 302(1) (556). If the server 106 is not local or resides close to the first device 302(1), the first device 302(1) may send the user request to a second device 302(2) (558). Otherwise, the first device 302(1) can obtain and/or acquire the user context from the second device 302(2) (560). The first device 302(1) and/or second device 302(1) may provide access to the application resource (562).

Referring now to operation (552), and in some embodiments, a device 302 may receive a request for an application resource. A first device 302(1), intermediary between a client 102 and a server 106, may receive a request of a user session for an application resource from the server 106. The request can comprise a user request to access and/or utilize a service and/or resource in a network and/or computer environment, such as a request to access the device's 302 portal page for available application resources, a request destined to a server 106 with the application resource, and/or a request for a SaaS application. The request can initiate and/or originate from/with a client 102 that may request to access and/or utilize the service and/or resource in the network and/or computer environment. The request can comprise a cookie for the user session. The cookie for the user session can be created, generated, provided and/or established by the device 302, and can contain or include information from the user context and/or the destination of the user request (e.g., a server 106 and/or device 302 name and/or address). The cookie can contain information regarding the availability of the user context within a cache 306 of the device 302.

A DNS server 304 can receive the request from the client 102 and may direct or route the request to the device 302. The device 302 may be configured and/or designed to serve as an intermediary between different elements of the system 400, such as between client(s) 102, server(s) 106, network(s) 104, and/or other devices 302. In some embodiments, the device 302 (e.g., first device 302(1)) may receive the request from the DNS server 304, the request directed and/or routed by the DNS server 304 from the client 102. A different device (e.g., second device 302(2)) may have received and handled a prior request from the same client 102, from the DNS server 304, and may have already established, obtained or maintained a user context of a user of the client 102. Responsive to the request, the device 302 may determine the location of the user context among devices 302 in the system 400.

Referring now to operation (554), and in some embodiments, the device 302 may determine if the user context is or is not with (e.g., maintained, stored or located at) the device 302. Responsive to the request (user request), an analysis engine 310 included and/or residing in the device 302 may determine if the user context (e.g., a password, credentials and/or a group membership) is or is not stored in the cache 306 of the device 302. The analysis engine 310 may interface and/or interact with the cache 306 to determine whether the user context is absent or available in the device 302. The analysis engine 310 can determine the availability or absence of the user context according to information provided by/stored in a cookie (e.g., a location or address where the user context may be obtained and/or an indication that the user context may not be available or present in the cache 306 of the device 302) received with or in the request. In some embodiments, a first device 302(1) can determine that the user context of the user session is with a second device 302(2), e.g., according to the cookie. The second device 302(2) may be in a second location that is farther from the server 106 hosting the application resource than a first location of the first device 302(1) relative to the server 106. If the first device 302(1) includes and/or stores the user context, the first device 302(1) can provide access to the application resource using the locally available user context. If the second device 302(2) includes and/or stores the user context, the first device 302(1) may determine the location and/or proximity of the server 106 hosting the application resource to the first device 302(1), e.g., to determine whether to obtain the user context from the second device 302(2).

Referring now to operation (556), and in some embodiments, the device 302 may determine if the server 106 hosting the application resource is local or not local or resides closer to the device 302. In response to determining that the user context is absent from the device 302, the analysis engine 310 (of the device 302) may determine whether the server 106 hosting the application resource is local or resides closer to the device 302, or not. For instance, the analysis engine 310 may determine that the device 302 is at a location is farther from the server 106 than another device 302 in another location relative to the server 106. The analysis engine 310 can determine the location of the server 106 and/or the proximity of the device 302 to the server 106 by, for example, analyzing and/or comparing the addresses (e.g., IP or virtual address) of the device(s) 302, server(s) 106 and/or application resources. The analysis engine 310 may utilize information provided by, supplied by, and/or stored in the cache 306, user context, and/or cookie to determine the location of the device 302 and/or the proximity between the device 302 and the server 106. In some embodiments, the first device 302(1) may determine that the server 106 is local or resides closer to the first device 302(1) than to the second device 302(2). In other embodiments, the first device 302(1) may determine that the second device 302(1) at a second location is farther from the server 106 than a first location of the first device 302(1). If the analysis engine 310 determines that the server 106 is local or resides closer to the second device 302(2) than to the first device 302(1), the first device 302(1) can send or direct the request (to access an application resource from the server 106) to or via the second device 302(2), e.g., to use user context at the second device 302(2) to access the application resource. If the analysis engine 310 determines that the server 106 is farther from the first device 302(1) than to the second device 302(1), the first device 302(1) can send or direct the request to or via the second device 302(2), e.g., to use user context at the second device 302(2) to access the application resource. If the analysis engine 310 determines that the server 106 is local or resides closer to the first device 302(1) the first device 302(1) may send a request to the second device 302(2) to obtain the user context from the second device 302(2), e.g., to use the obtained user context to locally/directly access the application resource, without detouring the access/traffic path via second device 302(2). If the analysis engine 310 determines that the server 106 is farther from the second device 302(2) than to the first device 302(1), the first device 302(1) may send a request to the second device 302(2) to obtain the user context from the second device 302(2), without detouring access/traffic path via second device 302(2).

Referring now to operation (558), and in some embodiments, the first device 302(1) may send the request to the second device 302(2). In response to determining that the server 106 is local or resides closer to the second device 302(2) and/or is farther from the first device 302(1), the first device 302(1) may send, transfer, direct, proxy, and/or route the request (to access the application resource) to the second device 302(2). In some embodiments, the first device 302(1) may send the request to the second device 302(2) after determining that the user context is with the second device 302(2) that is local or resides closer to the server 106. The first device 302(1) can send the request to the second device 302(2) using proprietary and/or public domain communication transport protocols (e.g., TCP, IP, UDP, SSL VPN and/or other similar protocols). Responsive to sending the request to the second device 302(2), the second device 302(2) and the first device 302(1) may provide the client 102 with access to the application resource from the server 106.

Referring now to operation (560), and in some embodiments, the first device 302(1) can obtain and/or acquire the user context from the second device 302(2). In response to determining the user context is with the second device 302(2) that is farther from the server 106 than the first device 302(1), the first device 302(1) may send a request to the second device 302(2) to obtain, request, and/or receive the user context. In some embodiments, the request to obtain the user context can comprise an API call from the first device 302(1) to the second device 302(2). A variety of protocols may be utilized to send an API call, such as proprietary and/or public protocols. The protocols can include at least one that can support an authenticated API call, whereby the recipient of the API call verifies the authenticity of the source of the call prior to providing the requested data. In some embodiments, a metrics exchange protocol (MEP) protocol may be used to send an API call to other devices 302. Responsive to the request, query, and/or API call, the first device 302(1) can receive, obtain, and/or acquire the user context from the second device 302(1). The first 302(1) and/or second device 302(2) can store the user context in the first device's cache 306. The first 302(1) and/or second device 302(2) may retrieve the user context from the second device's cache 306 after receiving a request to obtain, send, and/or transfer the user context. The first device 302 can utilize the user context to setup, arrange, and/or configure local context to send, direct, and/or route requests to access an application resource from the server 106, and/or to manage, establish and/or maintain a user session (e.g., to access the application resource). If the first device 302(1) can receive, obtain, and/or acquire the user context from the second device 302(2), the first device 302(1) may provide the client 102 with access to the application resource, e.g., directly via the first device 302(1) rather than via (a traffic path through) the second device 302(2) as well as the first device 302(1).

Referring now to operation (562), and in some embodiments, the device 302 can provide access to the application resource. In response to obtaining, receiving, and/or acquiring the user context, the analysis engine 310 (included in the device 302) can provide the client 102 with access to the application resource. The analysis engine 310 can provide the client 102 with access to the application resource according to the obtained user context. The analysis engine 310 may utilize information included in the user context (for example a password, credentials and/or a group membership) and/or cookie to determine whether the client 102 may have authorization and/or approval to access and/or utilize an application resource. The analysis engine 310 can interface and/or interact with one or more of the API 308, cache 306, and/or other elements of device 302 to determine whether the client 102 may be authorized to access and/or utilize an application resource. The analysis engine 310 may retrieve and/or obtain the user context from the cache 306 to determine whether the client 102 may be authorized to access and/or utilize the application resource. In some embodiments, the first device 302(1) determines that the client 102 is authorized to access and/or utilize the application resource.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

I claim:

1. A method comprising:
receiving, by a first device intermediary between a client and a server, a request of a user session for an application resource from the server;
determining, by the first device responsive to the request, that a user context of the user session is with a second device at a second location that is farther from the server than a first location of the first device;
sending, by the first device responsive to the determination, a request to the second device to obtain the user context of the user session; and
providing, by the first device, the client with access to the application resource via the user session according to the obtained user context.

2. The method of claim 1, comprising receiving, by the first device, the request from a domain name system (DNS) server, the request directed by the DNS server from the client to the first device.

3. The method of claim 1, comprising:
receiving, by the first device, the request comprising a cookie for the user session;
determining, by the first device, availability of the user context according to information of the cookie.

4. The method of claim 1, comprising determining, by the first device, that the user context is absent from a cache of the first device.

5. The method of claim 1, comprising determining, by the first device, that the server is local to the first device, or resides closer to the first device than to the second device.

6. The method of claim 1, comprising sending, by the first device, the request comprising an application programming interface (API) call to the second device.

7. The method of claim 1, comprising:
receiving, by the first device responsive to the request, the user context from the second device; and
storing, by the first device, the user context in a cache of the first device.

8. The method of claim 1, comprising determining, by the first device according to the user context, whether the client is authorized to access the application resource.

9. A first device, comprising:
at least one processor that is intermediary between a client and a server, the at least one processor configured to:
receive a request of a user session for an application resource from the server;
determine, responsive to the request, that a user context of the user session is with a second device at a second location that is farther from the server than a first location of the first device;
send, responsive to the determination, a request to the second device to obtain the user context of the user session; and
provide the client with access to the application resource via the user session according to the obtained user context.

10. The first device of claim 9, wherein the at least one processor is configured to receive the request from a domain name system (DNS) server, the request directed by the DNS server from the client to the first device.

11. The first device of claim 9, wherein the at least one processor is configured to:
receive the request which comprises a cookie for the user session;
determine availability of the user context according to information of the cookie.

12. The first device of claim 9, wherein the at least one processor is configured to determine that the user context is absent from a cache of the first device.

13. The first device of claim 9, wherein the at least one processor is configured to determine that the server is local to the first device, or resides closer to the first device than to the second device.

14. The first device of claim 9, wherein the request comprises an application programming interface (API) call to the second device.

15. The first device of claim 9, wherein the at least one processor is configured to:
receive, responsive to the request, the user context from the second device; and
store the user context in a cache of the first device.

16. The first device of claim 9, wherein the at least one processor is configured to determine, according to the user context, whether the client is authorized to access the application resource.

17. A non-transitory computer readable medium storing program instructions for causing at least one processor to:

receive a request of a user session for an application resource from a server, the at least one processor residing in a first device intermediary between a client and the server;

determine, responsive to the request, that a user context of the user session is with a second device at a second location that is farther from the server than a first location of the first device;

send, responsive to the determination, a request to the second device to obtain the user context of the user session; and provide the client with access to the application resource via the user session according to the obtained user context.

18. The non-transitory computer readable medium of claim 17, wherein the program instructions cause the at least one processor to receive the request from a domain name system (DNS) server, the request directed by the DNS server from the client to the first device.

19. The non-transitory computer readable medium of claim 17, wherein the program instructions cause the at least one processor to:

receive the request which comprises a cookie for the user session;

determine availability of the user context according to information of the cookie.

20. The non-transitory computer readable medium of claim 17, wherein the program instructions cause the at least one processor to determine that the server is local to the first device, or resides closer to the first device than to the second device.

* * * * *